United States Patent [19]

Lasater

[11] 4,055,789
[45] Oct. 25, 1977

[54] BATTERY-OPERATED MOTOR WITH BACK EMF CHARGING

[75] Inventor: Henry C. Lasater, Cuba, N. Mex.

[73] Assignee: Donald J. Dimmer, Cuba, N. Mex.; a part interest

[21] Appl. No.: 645,876

[22] Filed: Dec. 31, 1975

[51] Int. Cl.$^2$ ............................ H02J 7/00; H02P 7/20
[52] U.S. Cl. .......................................... 320/6; 318/138;
318/139; 320/14; 320/19
[58] Field of Search ............... 320/14, 15, 6; 318/248,
318/377, 138; 310/114

[56] References Cited

U.S. PATENT DOCUMENTS

| | | | |
|---|---|---|---|
| 3,173,042 | 3/1965 | Fodor | 310/114 X |
| 3,418,550 | 12/1968 | Kolatorowicz et al. | 318/138 |
| 3,560,818 | 2/1971 | Amato | 318/138 |
| 3,560,821 | 2/1971 | Beling | 318/138 |
| 3,611,091 | 10/1971 | Genovese | 320/14 X |
| 3,619,746 | 11/1971 | Thornton et al. | 318/138 |
| 3,863,084 | 1/1975 | Hasebe | 310/114 X |

Primary Examiner—Robert J. Hickey
Attorney, Agent, or Firm—Williamson, Bains, Moore & Hansen

[57] ABSTRACT

An energy conserving electrical apparatus for driving a load and recovering otherwise wasted electrical energy utilizes an electric motor with field windings on one or more pole members and one or more rotors. During a first time interval whose duration is determined by motor speed, electric current is supplied to the field windings from a first charged battery, the current flowing through electrical switching circuitry to the field windings of the motor to thereby turn the rotor by establishing a magnetic field, as is well known in the motor art. During a second time interval, the duration of which is also determined by motor speed, the rotor's poles confront the poles of the field winding and the switching circuitry disconnects the first battery from the field windings and connects a second discharged battery to the field windings for charging of the second battery. When the first battery is disconnected, the magnetic field established by the field windings collapses and, as a consequence of Lenz's law, a first current increment is induced in the field windings. This induced current increment, which is opposite in direction to the current which was flowing through the windings and whose stoppage produced the first current increment, is conducted through the switching circuitry to the second battery to charge the battery. Almost simultaneously with the generation of this first current increment, the magnetic field of the turning rotor links the field windings, inducing a second current increment in the coil windings. This second increment flows in the same direction as the first induced increment and is also conducted through the switching circuitry to charge the second battery. At the end of the second time interval, the electrical switching circuitry disconnects the second battery and reconnects the first battery to the field winding to again deliver current to the field winding to drive the rotor. Accordingly, the described first and second increments of current induced in the field windings between bursts of driving current are recovered by the apparatus and used to charge the second battery. A mode selection switch alternately connects the field windings to the first battery and then to the second battery at a predetermined frequency determined by the speed of the rotor's rotation and utilizes a rotating disk traveling at the same angular velocity as the rotor, the disk being provided with light transmitting apertures and by its rotation interrupting light transmission from a light source on one side of the disk to a light responsive fast switching element on the other side. Detection of light causes the switching element to shift from first to second mode causing the first battery to be disconnected and the second battery to be connected with the field winding for charging of the second battery. When no light is detected the element switches back to first mode. The invention may be used with either direct current or alternating current motors. Several embodiments of the invention are disclosed which utilize varying numbers of rotors and pole members.

9 Claims, 9 Drawing Figures

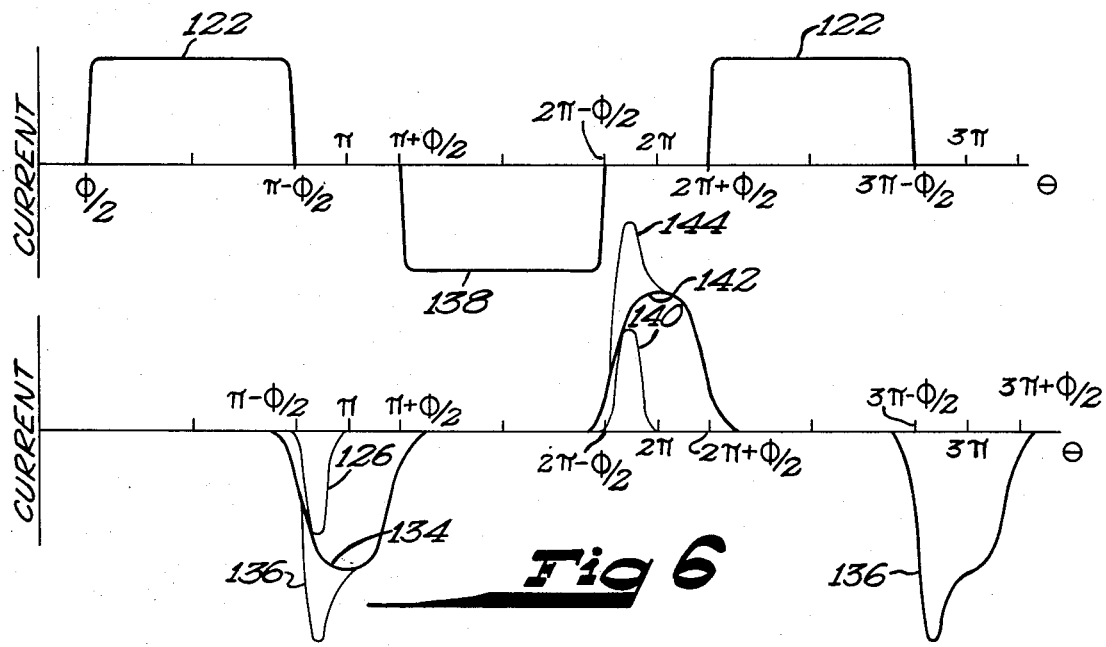
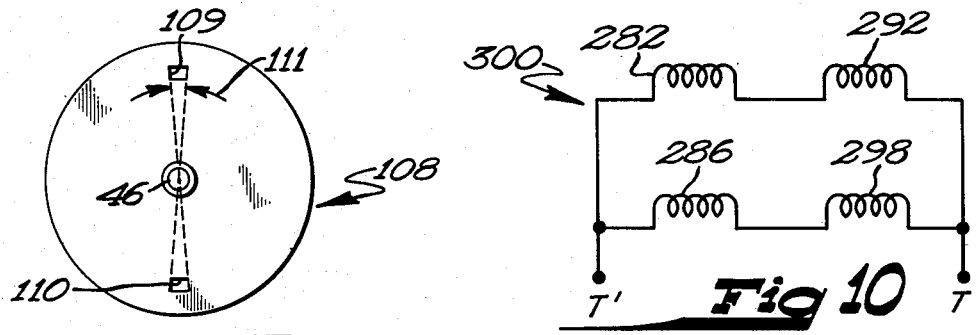
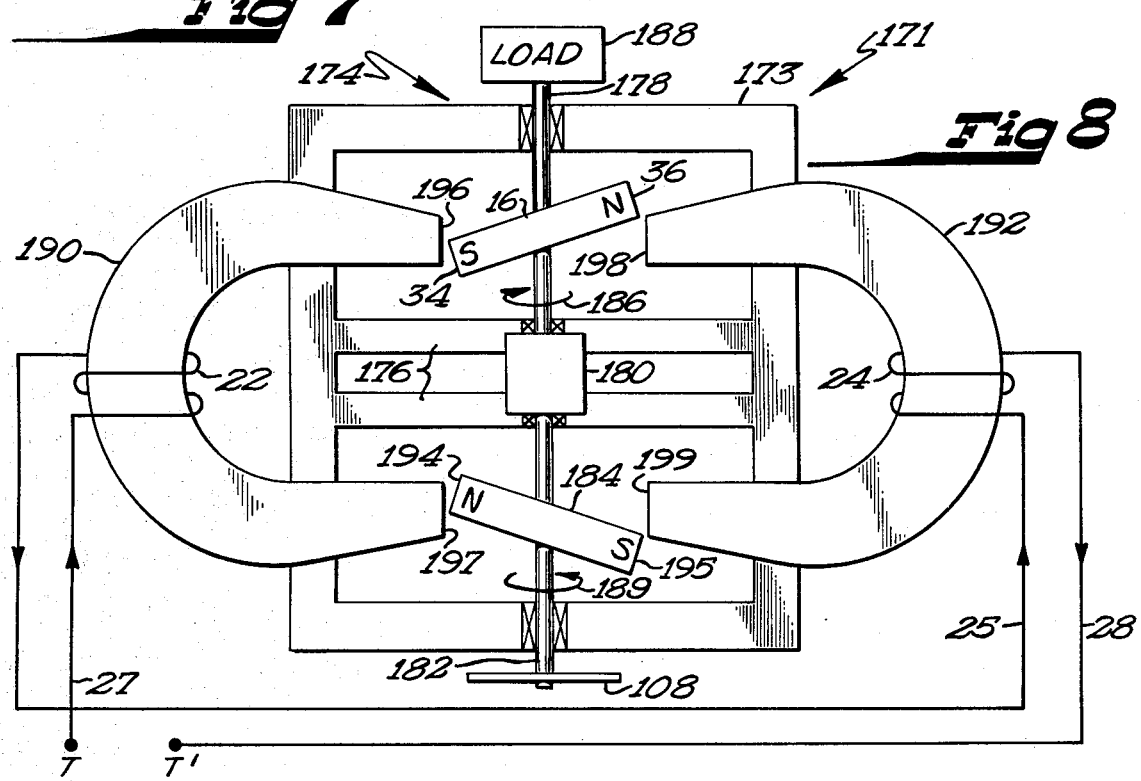

BATTERY-OPERATED MOTOR WITH BACK EMF CHARGING

BACKGROUND OF THE INVENTION

The present invention relates to the field of electric motors and comprises an energy conserving electrical apparatus designed to utilize otherwise wasted electromagnetic energy associated with back emf in motor windings, and also is designed to recover a further portion of unused electromagnetic energy induced in motor windings during normal motor operation, thereby conserving electrical energy and increasing motor efficiency.

During the operation of a conventional AC or DC electric motor, a plurality of stationary magnetic poles spaced about the rotor or armature are alternately energized to magnetically attract and repel the magnetic poles of the rotor to achieve rotor rotation. Typically, a pair of stationary poles is energized as the rotor poles approach the pair in order to attract the rotor. Polarity of the stationary poles is then reversed as the rotor poles pass the stationary poles in order to repel the rotor poles. During the brief time interval in which the rotor's poles directly confront the stationary field poles, the rotor poles are neither attracted nor repelled because of the distribution of force vectors between rotor poles and stationary poles. Accordingly, during this brief time interval there is little advantage to energizing the field windings. As the rotor poles pass the stationary poles the magnetic field of the rotor induces a current increment in the field windings of the stationary poles. This induced current and its well known, associated back emf serves no useful purpose in the motor and normally opposes current flow in the field windings. In addition, such induced current produces unwanted heat in the motor. It would be desirable to utilize these induced increments of current for a useful purpose, and the present invention accomplishes this object.

In conventional motors a second loss of energy occurs as a result of Lenz's law. Each time that current to a field winding of the motor is turned off, a reverse current is induced in the winding and with it an opposing field is generated in the winding which tends to oppose shrinkage of the original field. This reverse current associated with the opposing field has not been utilized for any constructive purpose in the past and the energy used to generate the opposing field has been wasted. The present invention utilizes this otherwise wasted energy and thus further conserves energy and increases motor efficiency.

SUMMARY OF THE INVENTION

The energy conserving electrical apparatus invention disclosed herein is usable with known motor designs and utilizes novel electrical switching circuitry connected with the motor field windings to alternately drive the motor from a power source and to then turn off the driving current and during a brief time interval recover otherwise wasted electromagnetic energy stored in the motor and use it to charge a depleted storage battery.

The field windings of the motor are connected with the switching circuitry to conduct current at regular intervals from the field windings to the depleted battery through one or more diodes or rectifiers, thereby permitting current to flow toward the depleted battery but preventing discharge from the battery.

The switching circuitry utilizes a mode selection switch which shifts between a first mode, wherein driving current from the power source is delivered to the field windings of the motor and the depleted battery is isolated, and a second mode, wherein the driving current from the power source is turned off and the field windings are connected through the switching circuitry in charging relationship to the depleted battery. The mode selection switch shifts between the described first and second modes at a speed proportional to the angular velocity of the motor armature. Preferably, the mode selection switch utilizes a disk mounted on the armature or rotor shaft which turns with the shaft, the disk being provided with two or more light transmitting apertures therethrough. On one side of the disk a light source transmits a beam toward the disk and is positioned to align with the apertures to have the beam directly confront and pass through the light transmitting apertures as the disk turns with the rotor shaft. A light detector is positioned on the other side of the disk so as to receive and detect the beam as it intermittently passes through the disk as the light aperture aligns with the light source and detector. In response to detection of the light beam by the detector, a high-speed switching element is actuated to shift between the first and second modes. Accordingly, the motor is driven utilizing standard motor technology and the driving current to the motor is turned off for brief time intervals as the poles of the rotor confront the stationary pole member or members. During this brief time interval the current induced in the windings of the pole members is delivered to the depleted battery for charging.

As the driving current to the field windings of the motor ceases, the magnetic field created by the driving current begins to contract. As a consequence of this contracting of the field, a current is induced in the field windings, such current being in a direction opposite to the original driving current. This current increment, which is hereafter called the lag current increment, is conducted through the switching circuitry to the depleted battery to charge the battery.

During rotation of the rotor past the field poles during the brief interval in which the driving current is turned off, the magnetic field of the rotor, which may be produced by either the rotor being a permanent magnet or by field windings on the rotor, links the field windings of the stationary pole members and produces a generated current in the windings. This generated current, hereafter called the generator effect current increment, is well known and is associated with the motor phenomenon described as back emf. Both the lag current increment, described earlier, and this generator effect current increment occur during the brief time interval between bursts of driving current and during the time in which the mode selection switch is in the second mode, thereby permitting the current increments to be conducted through the switching circuit to charge the depleted battery.

Two embodiments of the electrical switching circuitry are shown herein, the first of which charges the depleted battery continually, and a second, which charges the battery when the mode selection switch is in the second mode and only during a half cycle of the motor.

Several embodiments of motors are shown herein which are usable with the invention, such motors having from one to four rotors. In all of these embodiments the rotors of the motor turn at the same angular velocity and all of the rotors simultaneously confront pole members to define a continuous magnetic circuit through each rotor and the pole members confronted. Such an arrangement increases the magnitude of the generator type current increments produced between bursts of driving current.

The invention thus utilizes the electromagnetic energy normally stored in motors during their operation and much of which is otherwise wasted in large part and dissipated in eddy currents and in heat losses, the invention salvaging much of this otherwise wasted energy to charge a battery.

These and other advantages of the invention will be apparent from the appended drawings and the following detailed description.

BRIEF DESCRIPTION OF THE DRAWINGS

FIG. 7 is a front elevation view of a disk used with the switching circuit of FIGS. 4 and 5.

FIG. 8 is a perspective drawing of a motor embodying the invention wherein a pair of rotors is utilized.

FIG. 9 is a perspective drawing of a motor embodying the invention wherein four rotors are utilized.

FIG. 10 is an electrical schematic drawing of the circuit of the windings utilized on the pole members of the embodiment of FIG. 9.

DESCRIPTION OF THE PREFERRED EMBODIMENTS

Figure 1:
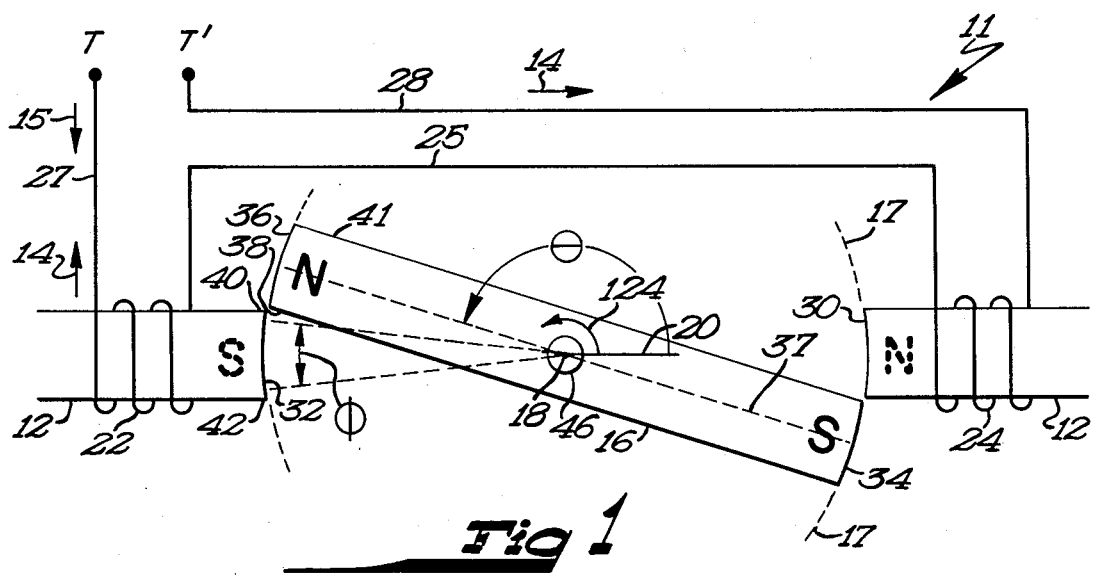
FIG. 1 is a pictorial drawing of a motor usable with the invention wherein the rotor is shown as being in a position approaching the poles of a stationary pole member.
Figure 2:
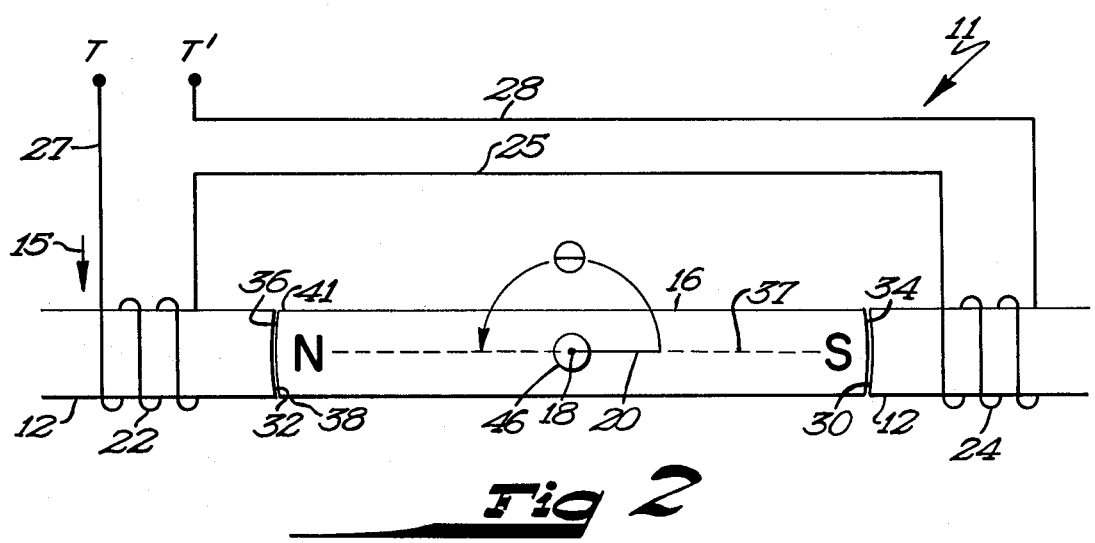
FIG. 2 is a pictorial drawing of the motor of FIG. 1 wherein the rotor is directly aligned with and confronting the poles of the stationary pole member.
Figure 3:
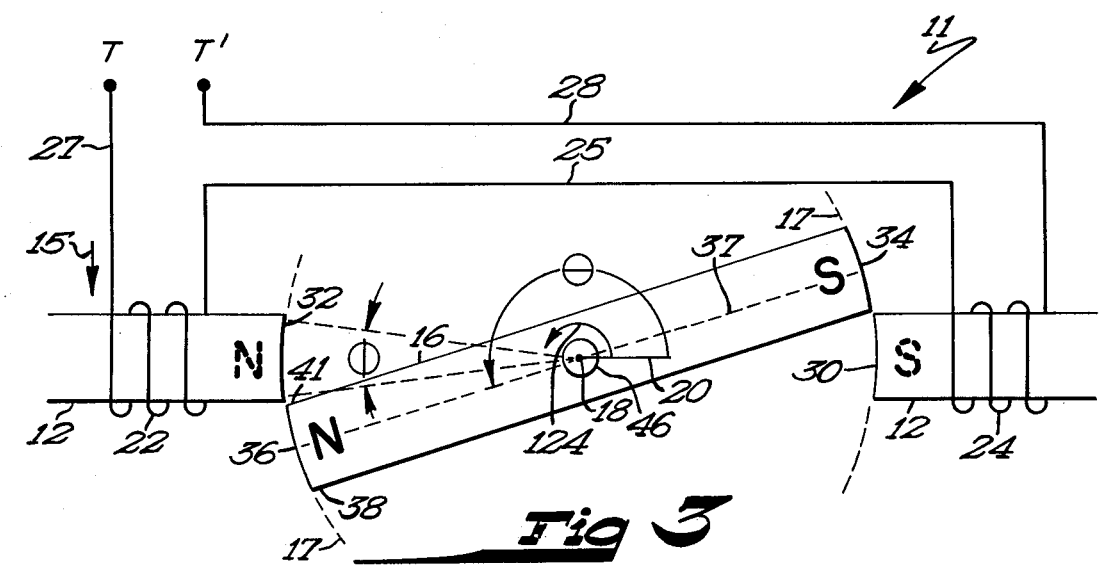
FIG. 3 is a pictorial drawing of the motor of FIG. 1 with the rotor shown departing from and being repelled by th poles of the stationary pole member.

In presenting a detailed description of the preferred embodiments of the invention, it is helpful to briefly examine the operation of a two-pole motor of the type shown in FIGS. 1-3 to fully appreciate the purpose and function of the invention.

Referring now to FIGS. 1-3, which show a two-pole motor 11 wherein the rotor or armature 16 is shown at three successive displacement positions in the course of its rotation, pole member or stator 12 is positioned on frame 44 along and closely adjacent the path 17 of the rotor or armature 16 which is mounted to the frame for rotation and turns about axis 18. In describing the operation of the motor 11, the rotor will be presumed to turn in a counterclockwise direction from axis 18 with its instantaneous angular displacement from starting line 20 being identified as $\theta$, which is the product of the angular velocity of rotor 16 and the time interval during which the rotor has been turning. Steady state operation of motor 11 and a constant angular velocity of the rotor will be assumed in this description.

As shown in FIGS. 1-3, rotor 16 includes means for generating a magnetic field about the rotor, such means here being provided by the rotor being a permanent magnet with north and south poles 36 and 34, respectively. If desired, the rotor may be provided with coil windings and the magnetic field of the rotor established by electromagnetic induction instead of the use of a permanent magnet.

Pole member 12 is provided with field windings 22 and 24 which comprise a stationary means to generate a magnetic field, and windings 22 and 24 are electrically connected in series by conductor 25. Coil terminals T and T' are connected with conductors 27 and 28, respectively, which are in turn electrically connected with the coil or field windings 22 and 24, respectively.

In normal operation a driving current flows through field windings 22 and 24 in direction 14 and may be a pulse of DC current or alternatively may be a half cycle of a sinusoidal current. For illustration, it will be presumed that a pulse of direct current is applied at the terminal T' and flows along conductor 28 to energize field windings 24 and 22 as the current returns to terminal T along conductors 25 and 27. Such current flow through windings 22 and 24, which comprise coil means for establishing a magnetic field, results in a north seeking pole being established at pole 30 of pole member 12 and a south seeking pole being established at pole 32 of member 12.

It will be presumed that lines of force of the magnetic field emanate outwardly from a north seeking pole and flow toward a south pole. As best shown in FIG. 1, the south pole 34 of rotor 16 is attracted to north pole 30 of member 12 while simultaneously the permanent north pole 36 of rotor 16 is similarly attracted to south pole 32 of the member 12. These magnetic attractions cause the poles of rotor 16 to be moved toward poles 30 and 32, eventually confronting those poles directly when the angle $\theta$ equals 180°, as best shown in FIG. 2. Current flow through windings 22 and 24 served a valuable function in attracting rotor 16 toward poles 30 and 32 of pole member 12, but when rotor 16 is in the position where the angle $\theta$ is 180° as shown in FIG. 2, there is no advantage in energizing coil 22 or 24 because the attractive forces between poles 32 and 36 and between poles 34 and 30 do not cause movement of rotor 16 because such forces are directed along axis 37 of the rotor. For this reason, in normal motor operation the current is normally reversed by a commutator or other polarity reversing means as rotor 16 reaches a position where $\theta$ is 180°, and an equal but oppositely directed current is applied to windings 22 and 24 (FIG. 3) and flows in direction 15 to create a north pole at pole 32 and a south pole at pole 30. Accordingly, rotor 16 has its poles 34 and 36 repelled from poles 30 and 32, respectively, and continues its rotation along path 17 in direction 124.

As rotor 16 turns about axis 18 and its north and south poles 36 and 34, respectively, sweep past poles 32 and 30, respectively, the outwardly extending field of the rotor permanent magnet links coil windings 22 and 24 and by a generator effect induces a voltage across such windings which is commonly described as a back emf. Along with the induced voltage, a current increment is also induced in the windings, such current flowing in a direction so as to create its own magnetic field which opposes the inducing field of the rotor magnet. Accordingly, the current increment induced in windings 22 and 24 by this generator action of rotor 16 flows in direction 15 from terminal T, through the coil windings 22 and 24 and toward terminal T'. This induced current increment caused by the generator effect must be overcome by the driving current when the motor is operating. A feature of the present invention is that the driving current to the field windings is turned off just prior to poles 34 and 36 of rotor 16 directly confronting poles 30 and 32, respectively, of stator 12 and is turned on as rotor poles 34 and 36 pass stator poles 30 and 32, respectively, in order that the current increment induced in coil windings 22 and 24 by the described generator effect can be utilized and conducted away to charge an electrical storage battery, as will be further described hereafter. For example, the driving current may be turned off as axis 37 of rotor 16 enters the angular sector $\theta$ and turned on as axis 37 of the rotor leaves the sector $\theta$. As best seen in FIG. 1, the driving current would be off for a time interval adequate for the axis of the rotor 16 to move through a predetermined angle $\theta$. Depending upon the construction of the rotor or the stator pole, the magnitude of angle $\theta$ may vary to obtain optimum results. Hereafter the apparatus will be described which permits the interruption of the driving current and the utilizing of the induced, "generator effect" current increment.

Referring again to FIG. 1, as indicated earlier, the driving current flowing in direction 14 is applied to coil windings 22 and 24 to attract the rotor 16 toward stationary poles 32 and 30 and then turned off as axis 37 of rotor 16 enters the sector $\phi$. At the instant the driving current is discontinued, the field established by the driving current begins to contract. As a consequence of Lenz's law contraction of the field causes the induction of a second current increment in field windings 22 and 24 and the direction 15 of this current increment is such as to induce a field opposing the contraction of the field produced by the driving current. The described second current increment, hereafter called a lag current increment, as a result on Lenz's law flows in the same direction 15 as the generator effect current increment described earlier. The apparatus of the present invention makes it possible to utilize the lag current increment produced as a result of Lenz's law in order to charge a storage battery and thereby conserve the otherwise wasted electrical energy. Because the energy associated with the lag current increment and the generator effect of increment are conducted away from the coil windings and utilized elsewhere, their impact on the operation of motor 11 of FIGS. 1–3 is lessened; this is desirable because these current increments reduce the operating efficiency of the motor because the driving current must continually overcome them to operate the motor.

Figure 4:
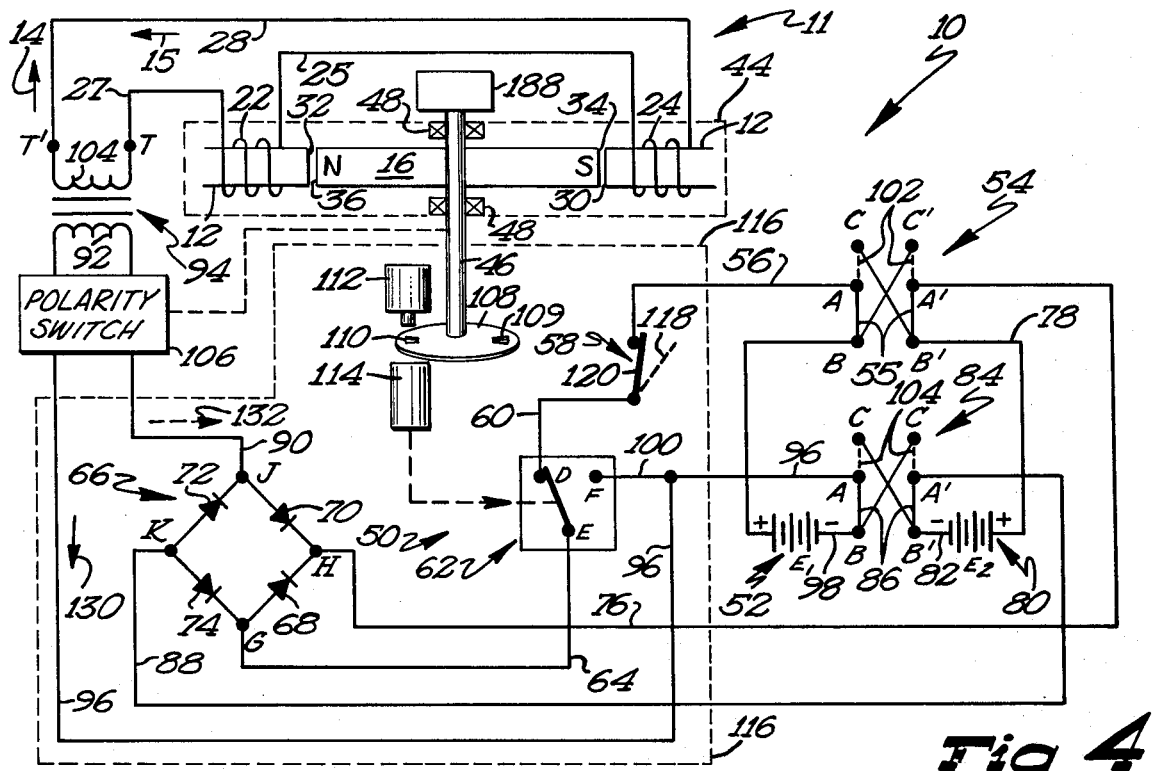
FIG. 4 is a schematic diagram of an embodiment of the invention.

Referring now to FIG. 4, a first embodiment 10 of the energy conserving apparatus is shown for illustrative purposes as utilizing a two-pole motor 11 identical to that described in FIGS. 1–3. Frame 44 supports pole member 12 and rotatably mounts the shaft 46 in bearings 48, the shaft 46 carrying rotor 16 for rotation with the shaft. A mode selection switch 50 has its components mounted on and adjacent the shaft 46 and will be described in further detail hereafter.

Referring again to FIG. 4, a first battery 52 has its positive terminal connected to terminal B of double-pole, double-throw switch 54. When switch 54 is in position 55, a circuit exists from battery 52 to terminal B, through the switch to terminal A and thence through conductor 56, through off-on switch 58 which is in closed position 120 and through conductor 60 which is connected to terminal D of a high-speed switching element 62.

Switching element 62 is operable between a first mode or state, wherein a closed circuit occurs between terminals D and E, and a second mode, wherein a closed circuit instead occurs between terminals E and F. Preferably the switching element 62 is a fast-action solid state switch utilizing either transistors or silicon controlled rectifiers to shift between the first and second modes. It should be understood that the switch element symbol 62 representing the switch element is purely representational and that a high-speed electronic switch is contemplated and within the purview of the invention.

The terminal E of element 62 is connected through conductor 64 to terminal G of a diode bridge 66. The bridge 66 includes diode 68 connected between terminals G and H to conduct current from G to H, diode 70 connected between terminals H and J to conduct current from J to H, didoe 72 connected between terminals J and K to conduct current from K to J, and diode 74 connected between terminals K to G to conduct current from K to G.

A conductor 76 extends between terminal H of bridge 66 and terminal A' of double-pole, double-throw switch 54. When the switch 54 is in position 55, terminal A' is connected in series with terminal B' which in turn is connected through conductor 78 to the positive terminal of a second electrical storage battery 80. The negative terminal of battery 80 is connected through conductor 82 to terminal B' of double-pole, double-throw switch 84. Batteries 52 and 80, when at full charge, are of substantially equal voltage.

Double-pole, double-throw switch 84 when in position 86 forms a closed circuit from terminal B' to terminal A', which is connected through conductor 88 to terminal K of diode bridge 66. Terminal J of bridge 66 is connected through conductor 90 to polarity switch 106. The switch 106 is connected through conductor 96 to terminal A of switch 84 which forms a closed circuit from terminal A to terminal B when in position 86. Terminal B is connected to the negative terminal of the first battery 52 by conductor 98. A conductor 100 extends from conductor 96 to terminal F of switching element 62.

The polarity switch 106 is comprised of switching apparatus well known to the art, such as a conventional commutator, and in response to rotation of shaft 46 reverses the polarity of current supplied to transformer 94, described hereafter, in order to alternate the polarity of the current supplied to the coil means 22 and 24 in order to drive rotor 16. The switch 106 is needed when the motor 11 is energized by direct current and serves as a polarity reversing means. When alternating current is used, the conductors 90 and 96 are connected directly to secondary winding 92 of the transformer 94 and the polarity switch 106 may be omitted.

Both double-pole switches 54 and 84 have their terminals C and B' shorted and also the terminals B and C' shorted. The reason for such shorting is to permit the first and second batteries 52 and 80 to be interchanged when switch 54 is swung to position 102 and switch 84 swung to position 104. Accordingly, the switches 54 and 84 comprise interchange circuitry for selectively electrically interchanging the first and second batteries, for reasons which will be explained further hereafter.

Transformer 94 has its secondary coil 92 connected across the output of polarity switch 106 and has its primary coil 104 connected across terminals T-T' of the motor 11. Transformer 94 steps voltage down from battery voltage at the polarity switch 106 to a lower level across T-T'. Naturally, the motor 11 is designed to operate at the lower voltage at T-T'. The generator effect current increment and the lag current increment arising at motor 11 have their voltage stepped up as they cross the transformer 94 in order to charge the discharged battery 80. In addition the transformer may serve a phase shifting purpose with its inductive load.

Directing attention now to the motor 11, while a two-pole motor is shown, it should be understood that the invention is equally applicable to motors having a greater number of poles. It has been found desirable to form the pole member 12 of material which has a relatively low magnetic retentivity in order that magnetic polarity reversals may be more easily and rapidly achieved. The importance of such rapid reversals will become further evident as the operation of the embodiment 10 is described hereafter.

Referring now to FIGS. 4 and 7, a thin generally circular disk 108 is fixed to shaft 46 to rotate with the shaft and is provided with a pair of light transmitting apertures 109 and 110, each of which subtends an arc having an angle 111, the size of which defines the time interval during which the driving current from battery 52 is discontinued, as will be further described hereafter. Apertures 109 and 110 comprise index means which are fixed relative to the rotor 16 and accordingly the position of the apertures indicates the angular displacement of the rotor. Disk 108 is oriented relative to rotor 16 such that the detector detects the apertures when the poles of the rotor confront pole member 12 over the predetermined angle $\phi$. A light source 112 is positioned on a first side of the disk 108 and is aligned to direct its light beam directly at and through the light transmitting apertures 109 and 110 as they rotate past the beam, the light apertures 109 and 110 being spaced radially outwardly along the disk and from shaft 46 at a radial distance equal to the distance of light source 112 from shaft 46. A light detector 114 is positioned on the second side of disk 108 and aligned relative to shaft 46 and light source 112 to receive and detect any light passing through apertures 109 and 110 from the source 112. The light source 112 and detector 114 collectively define an index detector which detects the light apertures to indicate that the rotor 16 is at certain angular positions which are of interest. Detector 114 is constructed and arranged to actuate the fast switching element 62 in response to detection of the light beam from source 112, and the switching element 62 on actuation switches from a first mode, wherein a closed circuit occurs between terminals D and E and an open circuit occurs between terminals E and F to a second mode wherein a closed circuit occurs between terminals D and E and an open circuit occurs between terminals E and F. Naturally, the fast switching element 62 should have an operating cycle of extremely short duration and its response time for shifting between modes should be much less than the time interval required for the disk 108 to span the angle $\phi$.

Light souce 112, disk 108 fixed relative to shaft 46, light detector 114, and fast switching element 62 collectively comprise a mode selection switch 50 which shifts between the described first and second modes. While the light transmitting apertures 109 and 110 of the disk provide one type of index means fixed relative to the disk 108 and the rotor 16, it should be understood that other known, alternative index means may be substituted and are within the purview of the invention. Correspondingly, the light source 112 and detector 114 provide one type of index detector capable of detecting apertures 109 and 110, but other known, alternative detectors appropriate for the index means used may be substituted and are within the purview of the invention.

While only two field poles are pictured as being used with the motor 11, it should be understood that additional pairs of poles will normally be used in driving the rotor. Some or all of the additional poles may also be utilized to recover the generator effect and lag current increments for charging of the storage battery 80. In addition, while the rotor has been shown as being a permanent magnet, it should be understood that the rotor may carry field windings and a plurality of poles energized electromagnetically. If desired, the generator effect and lag currents may be recovered from the armature windings instead of from the stationary field windings of the pole member or members. While not shown in the drawings, starting windings may be used with the motors shown herein just as with many known motors.

The diode bridge 66, the mode selection switch 50, and the associated circuitry, all of which is contained in the envelope 116, collectively comprise electrical switching circuitry 116 which is electrically connected with the coil windings 22 and 24 and with the first and second batteries 52 and 80, respectively, the function of the switching circuitry 116 being that of connecting the coil windings first to a source of driving energy such as battery 52 and then to the second battery 80 to permit charging of the second battery. The switching circuitry 116 shifts between these two modes of operation at a frequency proportioned to the angular velocity of the rotor 16.

In describing the operation of the embodiment 10, it will first be presumed that the apparatus is operating in a steady state at constant speed and that it will be energized with a direct current source such as fully charged first battery 52 connected with its positive terminal to terminal B of switch 54. A second battery 80 which is in a generally discharged or depleted condition is connected between the terminals B' of switch 54 and switch 84. While batteries of substantially any reasonable voltage level may be used with the invention, it is preferred that the voltage of batteries 52 and 80, when fully charged, be on the order of 30 to 40 volts. Before the motor 11 is energized it will be presumed that the mode selection switch 50 is in the first mode and provides a closed circuit between terminals D and E of element 62 and an open-circuit exists between terminals E and F. In addition, the double-pole, double-throw switches 54 and 84 will be presumed to be in positions 55 and 86, respectively, and off-on switch 50 is in closed position 120.

In operation, an operator first swings off-on switch 58 from open position 118 to closed position 120 to initiate driving current flow from the fully charged battery 52 to terminal B of switch 54. Current flows through switch 54 to terminal A and along conductors 56 and 60, passing through closed switch 58 and reaching terminal D of switching element 62. Current flow continues from terminal D to terminal F because the mode selection selection switch is in the first mode, as earlier presumed, permitting the current to flow along conductor 64 to terminal G of the diode bridge 66. Current flow continues in the forward direction through diode 68 to terminal H and along conductor 76 to terminal A' of the switch 54 and through the switch to terminal B' and conductor 78. Current flows along conductor 78 through the discharged battery 80, charging the battery 80 and continuing its flow along conductor 82 to and through switch 86 and conductor 88 to terminal K of the diode bridge 66.

Figure 6:
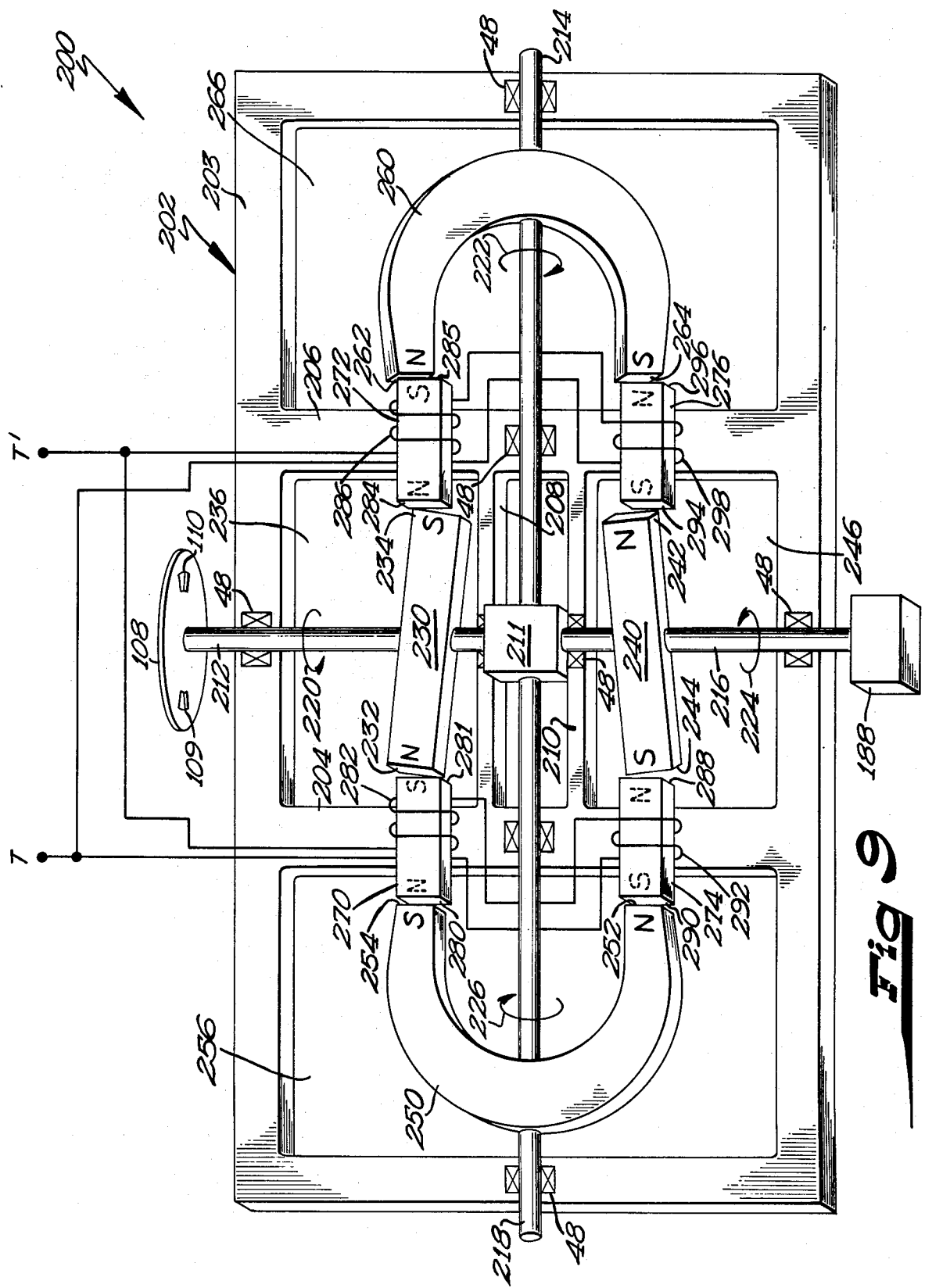
FIG. 6 is a set of graphs of current across the transformer secondary winding of FIG. 4 or 5 as a function of time, with the upper graph representing the driving current from a first battery and the lower graph representing the current increments recovered from the windings of the motor and used to charge a second battery.

Current flows from terminal K through diode 72 to conductor 90, passing through polarity switch 106 and being transferred through the switch 106 to the secondary 92 of the transformer 94. Current then returns along conductor 96 to terminal A of switch 84, flows through the switch and along conductor 98 to the negative terminal of first battery 52. The driving current which flows through the secondary 92 of transformer 94 is shown as waveform 122 of FIG. 6 and is the first half of a somewhat clipped square wave resulting from the action of mode selection switch 50 on the square wave which would otherwise result from the commutator action of polarity switch 106. The second half of the clipped square wave is shown at 138 (FIG. 6). The current waveform 122 is applied to the secondary 92 of transformer 94, and a somewhat lower voltage and higher current is induced in the primary 104, such current then flowing through field windings 22 and 24 in the direction 14.

Energizing of the coil means 22 and 24 with current in direction 14 causes the induction of a south seeking pole at pole 32 and a north seeking pole at pole 30, causing the rotor 16 to turn in direction 124 (FIG. 1). As axis 37 of rotor 16 enters the sector $\phi$, the rotating disk 108 (FIG. 4), turning with the shaft 46, brings light transmitting aperture 110 into a position directly confronting and aligning with light source 112, permitting the light beam from source 112 to pass through moving aperture 110 and to be detected by light detector 114. In response to detecting of the light beam the detector 114 actuates the high-speed switching element 62, causing the element to shift from the first mode, already described, to the second mode wherein a closed circuit occurs between terminals E and F and the terminals D and E are placed in an open circuit condition. This shift from first to second mode has the immediate effect of disconnecting first battery 52 from switching circuit 116 and accordingly disconnects field windings 22 and 24 from the first battery 52.

As driving current from battery 52 ceases to flow in field windings 22 and 24, the magnetic field about these windings and produced by the driving current contracts. As the field begins to shrink the direction of current flow in windings 22 and 24 reverses, and a short duration current increment flows in direction 15 (FIG. 4), and is passed through transformer 94 to induce a current increment 126 in secondary 92, the increment 126 having a higher voltage and lower current than the current flowing through the primary 104 from windings 22 and 24.

Current increment 126 passes through polarity switch 106 and flows along conductor 90 in direction 132 to terminal J of bridge 66. Current then flows through diode 70 and along conductor 76, passes from terminal A' to B' of switch 54 and along conductor 78 to charge the battery 80. The battery is prevented from discharging by the presence of diodes 68 and 70 in series with the battery which block current flow from battery 80 when switches 54 and 86 are in positions 55 and 86, respectively. From the battery 80 the current 126 continues along conductor 82, through terminals B' and A' of switch 84 and along conductor 88 to terminal K of diode bridge 66. The current 126 then flows through diode 74 to terminal G and along conductor 64 to terminal E of switching element 62. Because the element is now in the second mode, the current can flow from terminal E to terminal F and continues along conductor 100 and thence along conductor 96 back to the polarity switch 106 and secondary 92 of transformer 94.

Referring again to FIGS. 2 and 4, as poles 38 and 34 of rotor 16 approach the poles 32 and 30 of pole member 12 and while the mode selection switch 50 is in the second mode, the magnetic field extending from poles 38 and 34 of rotor 16 links the field windings 22 and 24, inducing the generator effect current in windings 22 and 24. This generator effect current increment is in direction 15 (FIGS. 1 and 4) and in flowing through primary 104 induces a generator current increment 134 in the secondary 92, the current 134 flowing in the same direction 132 as the current 126. Since currents 126 and 134 occur during approximately the same time interval they are summed to produce a resultant charging current 136 (FIG. 6) which is used to charge battery 80 between bursts of driving current 122 and 138. The current increments 126 and 134 both follow the same path through the charging circuit 116, as described in conjunction with lag current increment 126, and being increased in voltage by the transformer 94 are applied to charge the battery 80. These current components, although occurring in now available state of the art motors, have not previously been utilized and were regarded as undesirable because they generated unwanted heat and had to be repeatedly overcome by the driving current.

Referring again to FIG. 3, as axis 37 of rotor 16 leaves the sector $\phi$ the light transmitting aperture 110 passes the light beam and the solid body of the disk 108 obstructs any further transmission of light from light source 112 to detector 114 until at a later time the aperture 110 becomes aligned with the light source. During the intervening time period and substantially immediately after light is no longer detected by detector 114, the element 62 shifts from the second mode back to the first mode, creating an open circuit between terminals E and F and a closed circuit between terminals E and D. With mode selection switch 50 again in the first mode, the driving battery 52 again delivers a pulse to polarity switch 106, taking the same circuit route as described in conjunction with pulse 122 (FIG. 6). Polarity switch 106, which may be a commutator, reverses the polarity of the pulse from the battery, resulting in current pulse 138 (FIG. 6) being delivered to the secondary 92 of transformer 94. Accordingly, a pulse is induced in the primary 104 of transformer 94 and flows from winding 104 along conductor 27 in direction 15 to field windings 22 and 24, returning to the transformer along conductor 28. This current pulse estabishes a north seeking pole at pole 32 and a south seeking pole at pole 30, causing the poles 36 and 34 of the rotor to be repelled from the poles of the stator 12 and in the direction 124, as best seen in FIG. 3. The rotor 16 continues its rotation, eventually swinging through an angle of 180° advanced from that shown in FIG. 1, poles 34 and 36 of the permanent magnet of rotor 16 then being attracted to the north and south poles of pole member 12 in accordance with normal electric motor operation.

As the permanent north pole 36 of rotor 16 approaches pole 30 of member 12 and the axis 37 of the rotor enters the sector φ, disk 108 has rotated enough for light emitting aperture 109 to confront and align with light source 112, thereby permitting the light source to be detected by detector 114 which actuates fast switching element 62 to again shift it to the second mode wherein a closed circuit occurs between terminals E and F and an open circuit between terminals D and E.

As the driving current from battery 52 is discontinued, the magnetic field in field windings 22 and 24 diminishes, producing a current increment in coils 22 and 24 in direction 14. This increment is passed through the primary 104 of transformer 94 and results in a lag current increment 140 being induced in winding 92 and flowing in direction 130. The waveform 140 is substantially like waveform 126 but opposite in polarity. The current 140 flows through polarity switch 106 and along conductor 96 to conductor 100 and terminal F of element 62. Current flows from terminal F to terminal E, passing along conductor 64 to terminal G of the diode bridge 66 and then through diode 68 to terminal H. Current then flows along conductor 76 to and through terminals A' and B' of switch 54 and along conductor 78 to charge battery 80 before returning along conductor 82, switch 84 and conductor 88 to terminal K of the diode bridge. Current from terminal K flows through diode 72 to conductor 90 and returns to polarity switch 106 and transformer coil 92.

Substantially simultaneously with the generation of lag current increment 140, a second generator effect current increment is generated by the permanent magnet of rotor 16 passing field windings 22 and 24 and inducing a current in the windings in direction 14. This current flow passes through the primary 104 of the transformer and induces a higher voltage-lower current waveform 142 in the secondary 92. The generator effect current increment 142 passes through polarity switch 106 and flows in direction 130 along conductor 96. The resultant current 144 (FIG. 6) is the sum of the current increments 140 and 142 and follows a circuit identical to the circuit already described as being the path of the current increment 140.

As rotor 16 continues to turn and its axis leaves the sector φ as the rotor pole 36 passes the pole 30, the light transmitting aperture 109 no longer confronts light source 112 and accordingly the element 62 shifts from the second mode to the first mode, closing the circuit between terminals D and E so as to again supply driving current to the windings 22 and 24 from battery 52, as already described.

When first battery 52 has become substantially depleted, second battery 80 may be utilized as the driving battery to obtain additional driving time for the motor 11. To do so, switches 54 and 84 are swung from positions 55 and 86, respectively, to positions 102 and 104, respectively. This action results in the batteries 52 and 80 being interchanged in the circuit so that battery 80 now supplies driving current to motor 11 through the switching circuitry 116, and the now depleted battery 52 is connected so as to be charged.

If it is desired to run the motor 11 by means of alternating current rather than by direct current as has been described above, the interchange circuitry represented by switches 54 and 84 is unnecessary and the alternating current source may be connected directly between terminal F of element 62 and conductor 56. Similarly, battery 80, to be charged, should have its positive terminal connected to terminal H of diode bridge 66 and its negative terminal connected to terminal K of the diode bridge. When alternating current is used, battery 80 is charged during both positive and negative portions of the AC sinusoid and the polarity switch or commutator 106 is no longer needed. Whether AC or DC is used with the invention, the apparatus 10 still utilizes the described lag and generator effect current increments for charging, and these components do not substantially change their waveforms whether direct current of alternating current is used.

Figure 5:
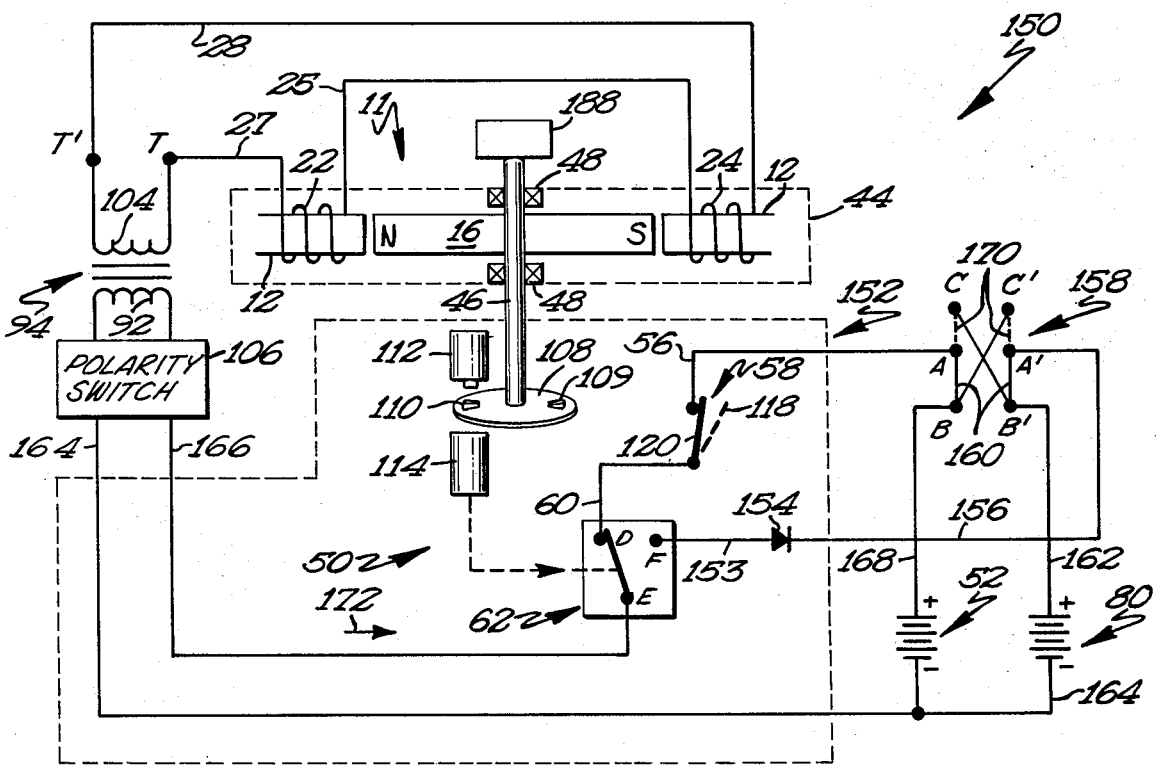
FIG. 5 is an electrical schematic diagram of a second embodiment of the invention.

Referring now to FIG. 5, a second embodiment 150 of the energy conserving electrical apparatus is shown, the embodiment 150 being similar to embodiment 10 of FIG. 4. In particular, it should be noted that the motor 11, transformer 94, polarity switch 106, and mode selection switch 50 are identical to those described in conjunction with embodiment 10. Only the switching circuit 152 and the construction of the interchange circuit, described hereafter, are different.

Referring now to FIG. 5, a conductor 153 extends from terminal F of switching element 62 to diode 154 which is positioned to conduct current from the element 62 toward the diode. The conductor 156 connects the diode to terminal A' of double-pole, double-throw switch 158.

When the switch 158 is in position 160 a closed circuit exists from terminal A' to terminal B' and conductor 162 extends from terminal B' to the depleted battery 80. The negative terminal of battery 80 is connected along conductor 164 to polarity switch 106 which is connected across the secondary 92 of transformer 94. Conductor 166 extends from polarity switch 106 to terminal E of element 62. Terminal D of element 62 is connected through conductor 60 to off-on switch 58, identical to that described in conjunction with embodiment 10, and switch 58 is connected through conductor 56 to terminal A of switch 158. Terminal B of switch 158 is connected by conductor 168 to the positive terminal of battery 52, which has its negative terminal connected to conductor 164. The circuitry and switching apparatus contained in envelope 152 comprise the electrical switching circuitry 152, which like circuitry 116 of embodiment 10 has for its purpose to alternately connect coil windings 22 and 24 to either first battery 52 or second batery 80 during first and second modes, respectively, of operation of mode selection switch 50.

The double-pole, double-throw switch 158 which is swingable between positions 160 and 170 (shown in phantom) and wherein the terminals C and B' are shorted and also terminals B and C' are shorted, serves as interchange circuitry for selectively electrically interchanging first battery 52 with second battery 80. Such interchanging makes it possible to drive motor 11 with battery 52 while charging battery 80, and then interchanging the batteries to drive motor 11 with battery 80 while charging battery 52. This permits additional driving time to be obtained over what would ordinarily be possible with a single charged battery. Naturally, as described in conjunction with embodiment 10, first battery 52 should be an initially fully charged battery, and battery 80 a partially or fully discharged or depleted battery. Interchanging of batteries would not normally occur until the discharged battery 80 has reached a reasonable state of charge.

The operation of embodiment 150 will not be described in the detail directed to the embodiment 10. It will be presumed that all facets of operation of embodiment 150 are identical to those described in conjunction with embodiment 10 except those which are hereafter described as being different.

When battery 52 is used for driving and battery 80 is charging, switch 158 is in position 160. To actuate embodiment 150 an operator swings off-on switch 58 to position 120, permitting current to flow from battery 52, along conductor 168, from terminals B to A of switch 158, along conductor 56, through switch 58 and conductor 60 to terminal D of fast switching element 62. For puposes of description, it will be presumed that element 62 is initially in the first mode and that accordingly a closed circuit exists between terminals D and E, as was the case with the description of first embodiment 10. Current passing through element 62 flows along conductor 166, passes through polarity switch 106 and secondary 92 before returning along conductor 164 to battery 52. Polarity switch 106 functions as described for switch 106 of embodiment 10 and accordingly secondary 92 is energized, current is induced in the primary 104 and motor 11 is energized, as described in conjunction with embodiment 10.

As rotor 16 turns about axis 18 and mode selection switch 50 eventually shifts to the second mode as the axis 37 of rotor 16 enters the sector $\phi$, a closed circuit occurs between terminals E and F of element 62 and terminals D and E shift to an open condition. The lag and generator effect current increments are induced in motor field windings 22 and 24, as described in conjunction with embodiment 10, and are tranferred through transformer 94 and their voltage stepped up, resulting in lag and generator effect current increments 126 and 134, respectively (FIG. 6), flowing in direction 172 from polarity switch 106, from terminals E to F of switching element 62 and along conductor 153 to diode 154. Current flows from diode 154 along conductor 156 passing through terminals A' and B' of switch 158 to flow along conductor 162 and charge battery 80. Accordingly, it should be noted that embodiment 150 is structured so that battery 80 is charged only by current increments 126 and 134. Current increments 140 and 142 (FIG. 6) produced during the negative driving cycle of motor 11 are blocked by diode 154 and have no charging effect on battery 80.

After battery 52 has become substantially depleted and battery 80 has reached a higher level of charge, the operator may swing switch 158 from position 160 to position 170 to thereby interchange batteries 80 and 52.

If desired, the battery 52 may be replaced with an alternating current source and the polarity switch 106 eliminated from the embodiment. Identical charging results of battery 80 will be obtained.

FIG. 8 shows another embodiment 171 of a motor usable in place of motor 11 already described. The motor 171 may be substituted for the motor 11 shown in FIGS. 4 and 5 by connecting the terminals T and T' of embodiment 171 directly to the terminals T and T' of the secondary 104 of FIG. 4 or 5. Accordingly, the same electrical switching circuitry 116 or 152, batteries, and interchange circuitry used with the embodiments shown in FIG. 4 or 5 may be used with embodiment 172.

Embodiment 171 has a rigid frame 174 with a generally rectangular member 173. Crossbars 176 interconnect the sides of the member 173 and rotatably support first and second shafts 178 and 182, respectively. The elongated shafts 178 annd 182 are also rotatably mounted to member 173 and extend into central gearbox 180 supported by the crossbars 176. A rotor 16 is mounted to the first shaft 178 to rotate with the shaft and is provided with means to generate a magnetic field about the rotor. For example, the means may be that rotor 16 is a permanent magnet or alternatively the rotor may be magnetized by field windings thereabout, as is well known to the art.

The second shaft 182 is rotatably mounted to member 173 and bar 176 and extends into gearbox 180. The shaft 182 carries a second rotor 184 which also has means to generate a magnetic field, just as described in conjunction with rotor 16 of embodiment 172. The rotor 184 rotates about the axis of shaft 182 in a generally circular path. Gearbox 180 is constructed and arranged such that rotation of first rotor 16 along a generally circular path centered on the axis of shaft 178 and in a first direction 186 causes an equal increment of rotation of rotor 184 in the opposite direction 189. Shaft 178 may be connected to a load 188 to drive the load in response to rotation of shaft 178. Shaft 182 carries disk 108 with light transmitting apertures as already described in conjunction with the embodiments of FIGS. 4 and 5 and having an identical function to the disk 108 described in conjunction with those embodiments.

Rotors 16 and 184 are fixed to shafts 178 and 182, respectively, such that rotors 16 and 184 are substantially parallel to one another at the instant that all of the rotors' poles 34, 36, 194 and 195 directly confront and align with the poles 196 and 197 of the pole member 190 and poles 198 and 199 of the pole member 192. Accordingly, when the rotors 16 and 184 are in such a position, there is a substantially continuous magnetic path or circuit extending from the rotor 16 through pole member 192, through rotor 184, and through pole member 190 back to rotor 16. At the instant that this magnetic circuit is formed, the magnetic lines of force extending from the poles of rotors 16 and 184 pass directly through pole members 190 and 192 and cause generation of a current in coil windings 22 and 24.

In operation, embodiment 171 functions much like motor 11 of FIGS. 4 and 5. When switch 58 is closed and mode selection switch 50 is in the described first mode, the battery 52 energizes the coil windings 22 and 24 and rotors 16 and 184 rotate in accord with normal motor principles in directions 186 and 189, respectively. Rotor 16 turns exactly as described in conjunction with motor 11, and rotor 184 behaves exactly as rotor 16 except that it rotates in the opposite direction 189. The rotational speed of rotors 16 and 184 is substantially identical, but some additional power for driving the load 188 is produced by the dual rotor embodiment 172.

When rotors 16 and 184 approach pole members 190 and 192 and the axes of the rotors enter the sector $\phi$ the mode selection switch 50, as described earlier, shifts from the first to the second mode for the time interval needed for the rotors to pass through the sector $\phi$, and during this time interval the driving current from battery 52 is turned off, permitting the embodiment 171 to recover the lag and generator effect current increments 126 and 134, respectively (FIG. 6), as described in conjunction with the embodiments of FIGS. 4 and 5. During the time interval in which the mode selection switch is in the second mode, each of the rotors 16 and 184 interacts with pole members 190 and 192 to produce the generator effect current increment 134 of FIG. 6. Because both of the rotors have their fields linking the field windings 22 and 24, the resultant generated current available for charging battery 80 has a somewhat larger magnitude than the current increment generated by the single turning rotor of FIGS. 1-5. Field windings 22 and 24 recover the lag current increment 126 just as described in conjunction with motor 11, and this component is also used for charging of battery 80. In view of the close correspondence between operation of the apparatus in FIGS. 4 and 5 and that shown in FIG. 8, further description of the operation is deemed unnecessary.

Referring now to FIG. 9, still another embodiment 200 is shown, the embodiment 200 being a motor connectable with the circuitry of FIG. 4 or 5 in place of the motor 11 of FIGS. 4 and 5. To interchange the embodiment 200 with motor 11 of FIG. 4 or 5, the embodiment 11 is simply removed from the circuit at terminals T-T' and embodiment 200 inserted.

Motor 200 has a generally rectangular frame 202 formed of rigid material and provided with generally parallel, spaced apart crossbars 204 and 206 extending between the sides of rectangular member 203 and rigidly fixed thereto by any means known to the art. Gearbox support beams 208 and 210 are generally parallel to one another and extend between crossbars 204 and 206 and are rigidly fixed to bars 204 and 206. Fixed to beams 208 and 210 is a gearbox 211 constructed and arranged to receive four mutually perpendicular and rotatably mounted shafts therein. Mutually perpendicular shafts 212, 214, 216 and 218 are rotatably mounted in bearings 48 and mechanically coupled with gearbox 211 such that rotation of any of the described shafts results in an equal increment of rotation of the remaining shafts in directions described hereafter. During normal operation, shaft 212 turns in direction 220, the shaft 216 turns in direction 224, shaft 214 in direction 222, and shaft 218 in direction 226. It should be understood that if the direction of rotation of any shaft is reversed, the directions of rotation of all the remaining shafts also reverse.

The shaft 212 carries the already described disk 108 and the shaft 216 is connected with the load 188, although it should be understood that the load or the disk may be attached on any of the shafts of embodiment 200.

A first rotor 230 is mounted on shaft 212 for rotation with the shaft and follows a first generally circular path centered on the axis of the shaft 212. Rotor 230 is provided with field generating means such as the rotor being a permanent magnet with poles 232 and 234. The rotor turns within a first rotor rotation chamber 236 bounded by the outer rectangular member 203, crossbars 204 and 206 and beam 208.

A second rotor 240 is fixed to shaft 216 for rotation therewith and has north and south magnetic poles 242 and 244, the poles of rotor 240 moving in a second generally circular path centered on the axis of shaft 216 and passing within the second rotor rotation chamber 246, which is defined by the rectangular member 203, crossbars 204 and 206 and beam 210. Preferably the axis of the shaft 216 coincides with the axis of the shaft 212.

A third rotor 250 is fixed to the shaft 218 for movement therewith and has field generating means such as north and south magnetic poles 252 and 254, respectively, the rotor 250 being generally U-shaped and symmetrical about the axis of the shaft 218 to permit poles 252 and 254 of the rotor to move in a generally circular path centered on the axis of the shaft. Rotor 250 moves within the third rotor rotation chamber 256 defined by the generally rectangular member 203 and the crossbar 204.

The fourth rotor 260 is mounted to shaft 214 to rotate therewith and has north and south magnetic poles 262 and 264, respectively, which serve as magnetic field generating means. Rotor 260 may be a permanent magnet and is generally U-shaped in configuration, the poles 262 and 264 rotating in a generally circular path centered on the axis of shaft 214. The rotor is mounted to turn within the rotor rotation chamber 266 defined by rectangular frame 203 and crossbar 206. Preferably the axis of the shaft 218 coincides with the axis of shaft 214.

Referring again to FIG. 9, first, second, third and fourth pole members 270, 272, 274 and 276, respectively, are fixed to crossbars 204 and 206 in any known manner. Pole member 270 is positioned between rotors 250 and 230 to have its poles 280 and 281 directly confront the poles of rotors 250 and 230 during their rotation. Pole member 272 is positioned between rotors 230 and 260 to have its poles 284 and 285 directly confront the poles of rotors 230 and 260. Pole member 274, correspondingly, is positioned between rotors 250 and 240 so as to have its poles 288 and 290 directly confront the poles of the rotors 240 and 250. Pole member 276 is positioned between rotors 240 and 260 so as to have its poles 294 and 296 directly confronting the poles of rotors 240 and 260 as the rotors move along their paths.

Each of the pole members is provided with means for generating a magnetic field. Pole member 270 is provided with field winding 282 about the pole member. The second pole member 272 is provided with field winding 286 about the member. The third pole member 274 has field winding 292 passing about the member. The fourth pole member 276 has field winding 298 about the member. Each of the windings 282, 286, 292 and 298 constitute a coil means for generating a magnetic field.

Referring now to FIG. 10, a schematic diagram 300 indicates the electrical connections of coil windings 282, 286, 292 and 298. Windings 282 and 292 are electrically connected in series, as are windings 286 and 298. The number of turns in each of the windings of FIG. 10 is substantially identical and the driving current supplied to each of the windings to energize and drive the rotors of embodiment 200 is substantially equal.

All of the pole members and the rotors of embodiment 200 are constructed and arranged so that the poles of each rotor directly confront and align with the adjacent poles of the adjacent pole members as the rotors travel along their paths. All of the rotors are positioned on the shafts so that the poles of all rotors simultaneously confront the poles of the pole members to create a substantially continuous magnetic circuit extending through all rotors and pole members during the brief interval of mutual alignment of all poles and rotors. The magnetic circuit extends from rotor 230, through pole member 272, rotor 260, pole member 276, rotor 240, pole member 274, rotor 250, pole member 270 and back to rotor 230, with the field lines produced by the rotor and pole fields being largely confined to this circuit.

The operation of motor 200 is similar to that described in conjunction with the motor 11 of FIGS. 4 and 5 except that with the embodiment 200 there are four rotors interacting with four pole members instead of the single rotor and pole member shown in embodiment 11. In operation, embodiment 200 would have its terminals T-T' connected with terminals T-T', respectively, of FIG. 4 or 5 and replaces the transducer 11 of FIGS. 4 and 5.

All of the rotors of embodiment 200 are driven from current supplied from battery 52 during the time interval in which the mode selection switch 50 is in the first mode. Because of the gearbox 211, which comprises gear means, the four shown shafts are constrained to turn at the same angular velocity. When the mode selection switch shifts to the second mode, each of the four rotors of embodiment 200 acts substantially the same as already described in conjunction with the single rotor of transducer 11 and the field windings 282, 286, 292 and 298 of embodiment 200 each have a lag current increment 126 induced in them by the contracting field resulting from the driving current being discontinued. As described in conjunction with motor 11, rotation of a rotor past the adjacent field windings induces a generator effect current increment 134, and naturally the rotation of the four rotors of embodiment 200 induces such generator effect current increments in all of the field windings of embodiment 200, producing a larger total current flow across terminals T-T' than was the case for embodiment 11. Because all the rotors simultaneously align with and confront their adjacent pole members to define a substantially continuous magnetic circuit, the magnetic flux density passing through each coil winding is increased over that which would be expected from a single rotor. The induced current in field windings 282, 292, 286 and 298 is delivered to battery 80 through the electrical switching circuitry of FIG. 4 or 5 to charge the battery exactly as described in conjunction with operation of the embodiments of FIGS. 4 and 5.

While the description of the embodiments shown in this disclosure show a rotor confronting no more than two poles, it should be understood that additional poles may be positioned along the path of each or all of the rotors to apply additional driving force to the rotors and some or all of the additional rotors may be used for recapture of the lag and generator effect current increments, as described. Accordingly, such additional poles positioned along the path of the rotors are within the purview of the present invention.

While in this disclosure the field windings have been shown as being in fixed positions on the frame, it should be understood that it is within the purview of the invention to shift or displace the positions of the field windings along the path of the rotor in order to make slight adjustments in the timing of the apparatus without substantially altering the speed of the rotor. By such shifting it is possible to have the rotor confront the pole of the shifted field winding slightly sooner or slightly later than would be the case if the field coil were not shifted. Such shifting may be utilized with any of the embodiments of the invention.

While the preferred embodiments of the present invention have been described, it should be understood that various changes, adaptations and modifications may be made therein without departing from the spirit of the invention and the scope of the appended claims.

What is claimed is:

1. In combination with first and second batteries, an energy conserving electrical apparatus for driving a load and recovering otherwise wasted electrical energy, comprising:
   a frame;
   a first rotor movably mounted to said frame for angular displacement along a path and about an axis, said rotor including a pair of poles and means for producing a magnetic field about said poles;
   a first stationary pole member supported by said frame and adjacent said path of said rotor, said member having a pair of poles closely confronting the path of said rotor, said pole member including stationary means for producing a magnetic field about said pole member to interact with said magnetic field of said rotor;
   at least one of said means for producing a magnetic field including coil means utilizing electromagnetic induction for establishing a magnetic field;
   polarity reversing means electrically connected with said coil means to alternately reverse the electrical polarity of current applied to said coil means to alternately reverse the direction of the magnetic field of said coil means to thereby produce angular displacement of said rotor about said axis;
   electrical switching circuitry operatively electrically connected with said coil means, with said first battery and with said second battery, said switching circuitry including a mode selection switch shiftable between a first mode, wherein said switch operatively electrically connects said first battery in series with said second battery to charge said second battery and in series with said coil means to drive said first rotor about said axis, and a second mode, wherein said first battery is disconnected from said coil means and from said second battery and said second battery is connected to said coil means in charging relationship with said coil means to charge said second battery with electrical energy induced in said coil means by said magnetic fields; and
   said mode selection switch shifting between said first and second modes in response to angular displacement of said rotor about said axis to energize said coil means from said first battery to thereby drive said rotor about said axis when in said first mode and when in said second mode to conduct current from said coil means to said second battery so that current induced in said coil means by said magnetic fields charges said second battery.

2. The apparatus of claim 1 and further including interchange circuitry for selectivity, operatively, electrically interchanging said first and said second batteries.

3. The apparatus of claim 1 wherein a diode is connected in said switching circuitry and is electrically connected in series with one of said batteries to block current flow out of the battery to which connected and to permit current flow into the battery with which connected, said apparatus further including a transformer electrically connected in coupling relationship between said coil means and said switching circuitry to permit energy transfer from said switching circuitry to said coil means to drive said rotor and also to permit energy transfer from said coil means to said switching circuitry to charge said second battery, said transformer having its primary winding connected across said coil means and its secondary winding connected in said switching circuitry and in series with said diode.

4. In combination with a battery and a second electrical energy source, an energy conserving electrical apparatus for driving a load and recovering otherwise wasted electrical energy, comprising:
   an electric motor including a frame, a first rotor mounted for rotation along a first path and about a first axis, and a stationary pole member, said rotor and said pole member each having means for producing a magnetic field and one of said field producing means including coil means;

electrical switching circuitry operatively electrically connected with said coil means, with said first battery and with said energy source, said switching circuitry including a mode selection switch shiftable between a first mode, wherein said switch operatively electrically connects said energy source in series with said battery to charge said battery and in series with said coil means to drive said first rotor about said axis, and a second mode, wherein said energy source is disconnected from said coil means and from said battery and said battery is connected to said coil means in charging relationship with said coil means to charge said battery with electrical energy induced in said coil means by said magnetic fields; and said mode selection switch shifting between said first and second modes in response to angular displacement of said rotor about said axis to energize said coil means from said energy source to thereby drive said rotor about said axis when in said first mode and when in said second mode to conduct current from said coil means to said battery so that current induced in said coil windings by said magnetic fields charges said battery.

5. The apparatus of claim 4 and further including:
a second rotor mounted on said frame for rotation along a second path and about said first axis, said second rotor being spaced from said first rotor along said first axis, and said second rotor including means for generating a magnetic field about said second rotor;

third and fourth rotors mounted on said frame for rotation along third and fourth paths, respectively, about a second axis substantially perpendicular to said first axis, said third and fourth rotors spaced from one another along said second axis and said third and fourth rotors each including means for generating a magnetic field about said third and fourth rotors, respectively;

second, third and fourth pole members on said frame, each of said pole members adjacent and confronting the paths of two of said rotors and each member including coil means thereon for generating a magnetic field when said coil means are energized, and said coil means of all said pole members being operatively electrically connected with said switching circuitry; and gear means mechanically coupled to all said rotors to cause all of said rotors to rotate about said axes at substantially equal angular velocity and to confront said first, second, third and fourth pole members substantially simultaneously to define a continuous magnetic circuit during confrontation.

6. The apparatus of claim 5 wherin said third and fourth rotors are generally U-shaped.

7. The apparatus of claim 5 wherein said frame includes four adjacent rotor rotation chambers and one of said rotors is positioned in each of said chambers.

8. The apparatus of claim 7 wherein said gear means causes said first and said second rotors to turn in opposite directions about said first axis and causes said third and fourth rotors to turn in opposite directions about said second axis.

9. The apparatus of claim 4 and further including:
a second rotor having first and second poles and rotatably mounted to said frame for rotation in a second path;
a second pole member mounted on said frame and having a pair of poles;
said pole members each having a first pole confronting said first path of said first rotor and a second pole confronting said second path of said second rotor; and
said first and second rotors being mechanically coupled to have all their poles simultaneously confront said poles of said pole members to define a substantially continuous magnetic circuit through all said pole members and rotors.

* * * * *